(12) United States Patent
Machida et al.

(10) Patent No.: US 6,920,851 B2
(45) Date of Patent: Jul. 26, 2005

(54) VARIABLE VALVE CONTROL APPARATUS FOR INTERNAL COMBUSTION ENGINE AND METHOD THEREOF

(75) Inventors: Kenichi Machida, Atsugi (JP); Makoto Nakamura, Atsugi (JP); Hirokazu Shimizu, Atsugi (JP); Isamu Iizuka, Atsugi (JP)

(73) Assignee: Hitachi, Ltd., Tokyo-to (JP)

( * ) Notice: Subject to any disclaimer, the term of this patent is extended or adjusted under 35 U.S.C. 154(b) by 0 days.

(21) Appl. No.: 10/730,012

(22) Filed: Dec. 9, 2003

(65) Prior Publication Data

US 2004/0182341 A1 Sep. 23, 2004

(30) Foreign Application Priority Data

Dec. 10, 2002 (JP) .......................... 2002-358310

(51) Int. Cl.[7] ................................. F01L 1/34
(52) U.S. Cl. .................. 123/90.16; 123/90.15; 123/345
(58) Field of Search .......... 123/90.15, 90.16, 123/90.17, 90.18, 345, 346, 406.11, 406.12, 406.13

(56) References Cited

U.S. PATENT DOCUMENTS 6,564,763 B2 * 5/2003 Shiraishi et al. ......... 123/90.15
6,691,022 B2 * 2/2004 Takemura et al. .......... 701/109

FOREIGN PATENT DOCUMENTS

| JP | 60150407 A | * 8/1985 | ............. F01L/1/34 |
|----|------------|----------|------------------------|
| JP | 9-195840 A | 7/1997 | |
| JP | 2001-041013 A | 2/2001 | |
| JP | 2001-164951 A | 6/2001 | |
| JP | 2001-182563 A | 7/2001 | |

* cited by examiner

Primary Examiner—Thomas Denion
Assistant Examiner—Ching Chang
(74) Attorney, Agent, or Firm—Foley & Lardner LLP

(57) ABSTRACT

In an internal combustion engine provided with a variable valve mechanism that varies a lift amount of an intake valve, when a target lift amount of the intake valve is a predetermined value or less, the target lift amount of the intake valve is limited to the predetermined value or above when the combustion variation reaches an allowable value or above.

24 Claims, 13 Drawing Sheets

VARIABLE VALVE CONTROL APPARATUS FOR INTERNAL COMBUSTION ENGINE AND METHOD THEREOF

FIELD OF THE INVENTION

The present invention relates to a variable valve control apparatus and a variable valve control method for an internal combustion engine, and in particular to a technology for controlling an intake air amount of an engine based on a lift amount of an intake valve.

RELATED ART OF THE INVENTION

Heretofore, there has been known an intake air amount control method for controlling an intake air amount of an engine by varying a lift amount of an intake valve (refer to Japanese Unexamined Patent Publication No. 2001-182563).

In a low lift region of an intake valve, since a change in intake air amount relative to a change in lift amount is large, there occurs a large difference in intake air amount depending on a small difference in lift amount.

Therefore, due to the variation in size of intake valve between cylinders or the adhesion of deposit to the intake valve, the variation in intake air amount occurs between cylinders in the low lift region, thereby resulting in the occurrence of torque variation or the deterioration of emission performance or fuel consumption.

SUMMARY OF THE INVENTION

It is therefore an object of the present invention to avoid the variation in intake air amount between cylinders in a low lift region, thereby enabling to prevent the occurrence of torque variation or the deterioration of emission performance or fuel consumption.

In order to accomplish the above-mentioned object, the present invention is constituted so that, when a target lift amount of an intake valve is a predetermined value or less, the target lift amount of the intake valve is limited to the predetermined value or above when the combustion variation of an internal combustion engine reaches an allowable value or above.

Moreover, according to the present invention, when the target lift amount of the intake valve is the predetermined value or less, the target lift amount of the intake valve is limited to the predetermined value or above when the variation in lift amount of the intake valve is an allowable value or above.

The other objects and features of the invention will become understood from the following description with reference to the accompanying drawings.

DESCRIPTION OF THE PREFERRED EMBODIMENT

Figure 1:
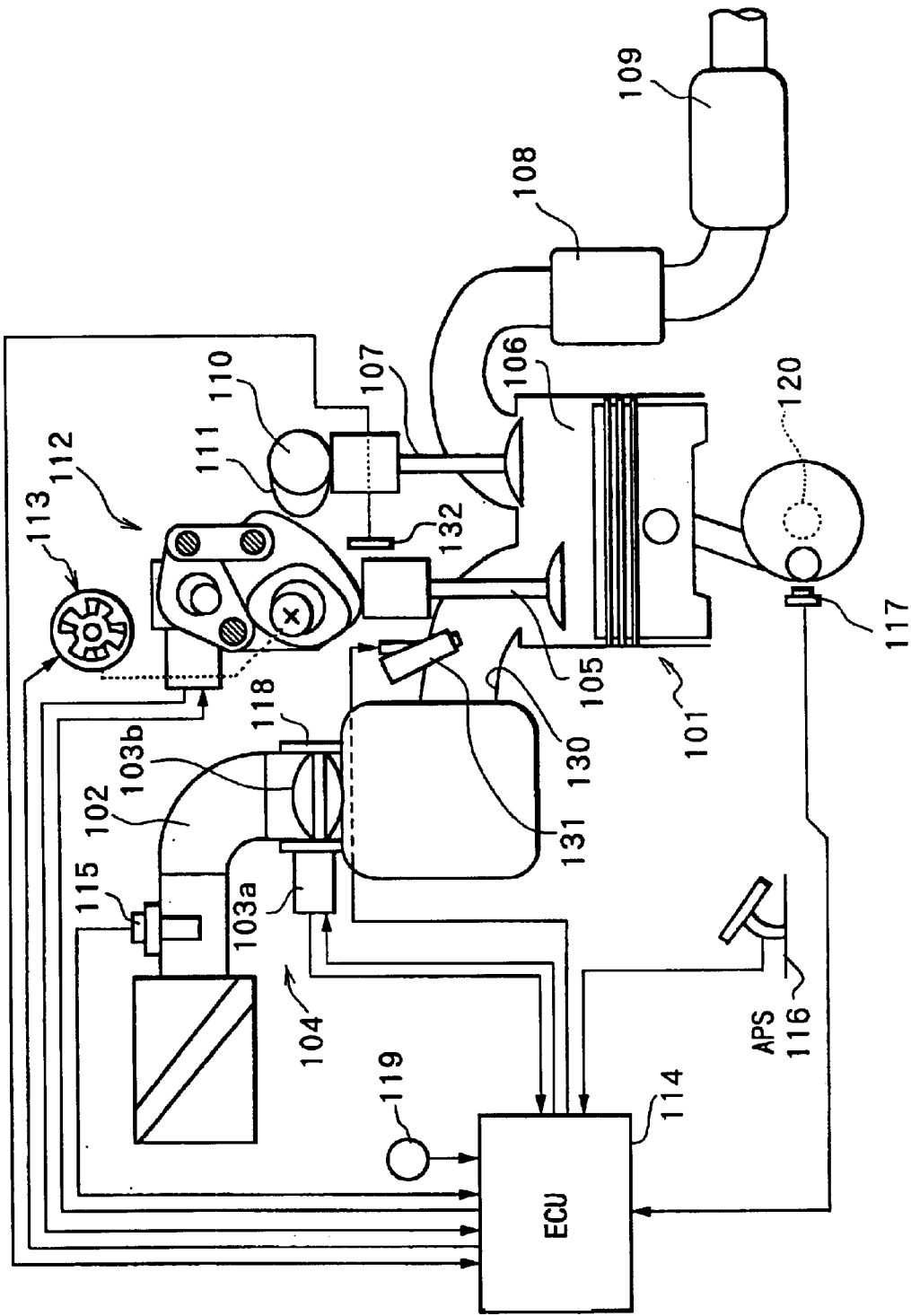
FIG. 1 is a diagram of a system structure of an internal combustion engine in an embodiment.

FIG. 1 is a diagram of a system structure of an internal combustion engine for vehicle comprising a variable valve mechanism according to the present invention.

In FIG. 1, in an intake passage 102 of an internal combustion engine 101, an electronically controlled throttle 104 is disposed for driving a throttle valve 103b to open and close by a throttle motor 103a (actuator). Air is sucked into a combustion chamber 106 via electronically controlled throttle 104 and an intake valve 105.

A combusted exhaust gas is discharged from combustion chamber 106 via an exhaust valve 107, and then, purified by a front catalyst 108 and a rear catalyst 109, thereafter, emitted into the atmosphere.

Exhaust valve 107 is driven by a cam 111 axially supported by an exhaust side camshaft 110, to open and close while maintaining a fixed valve lift amount, valve operating angle (valve timing).

On intake valve 105, there are disposed a VEL (variable valve event and lift) mechanism 112 that varies successively a valve lift amount and an operating angle of intake valve 105, and a VTC (variable valve timing control) mechanism 113 that varies successively a center phase of the operating angle of intake valve 105 by changing a rotation phase of intake side camshaft relative to a crankshaft.

An ECU (engine control unit) 114 incorporating therein a microcomputer, controls electronically controlled throttle 104, VEL mechanism 112 and VTC mechanism 113 so that a target intake air amount, a target intake pressure and a target residual gas rate, each corresponding to operating conditions, can be obtained.

ECU 114 receives detection signals from an air flow meter 115 detecting an intake air amount Q of internal combustion engine 101, an accelerator pedal sensor APS 116, a crank angle sensor 117 taking out a rotation signal from a crankshaft 120, a throttle sensor 118 detecting an opening TVO of throttle valve 103b, a cooling water temperature sensor 119 detecting a cooling water temperature Tw of internal combustion engine 101, and the like.

Further, on an intake port 130 on the upstream side of intake valve 105 of each cylinder, an electromagnetic type fuel injection valve 131 is disposed. Electromagnetic type fuel injection valve 131 is driven to open by an injection pulse signal from ECU 114, to inject fuel of a quantity proportional to an injection pulse width.

Figure 2:
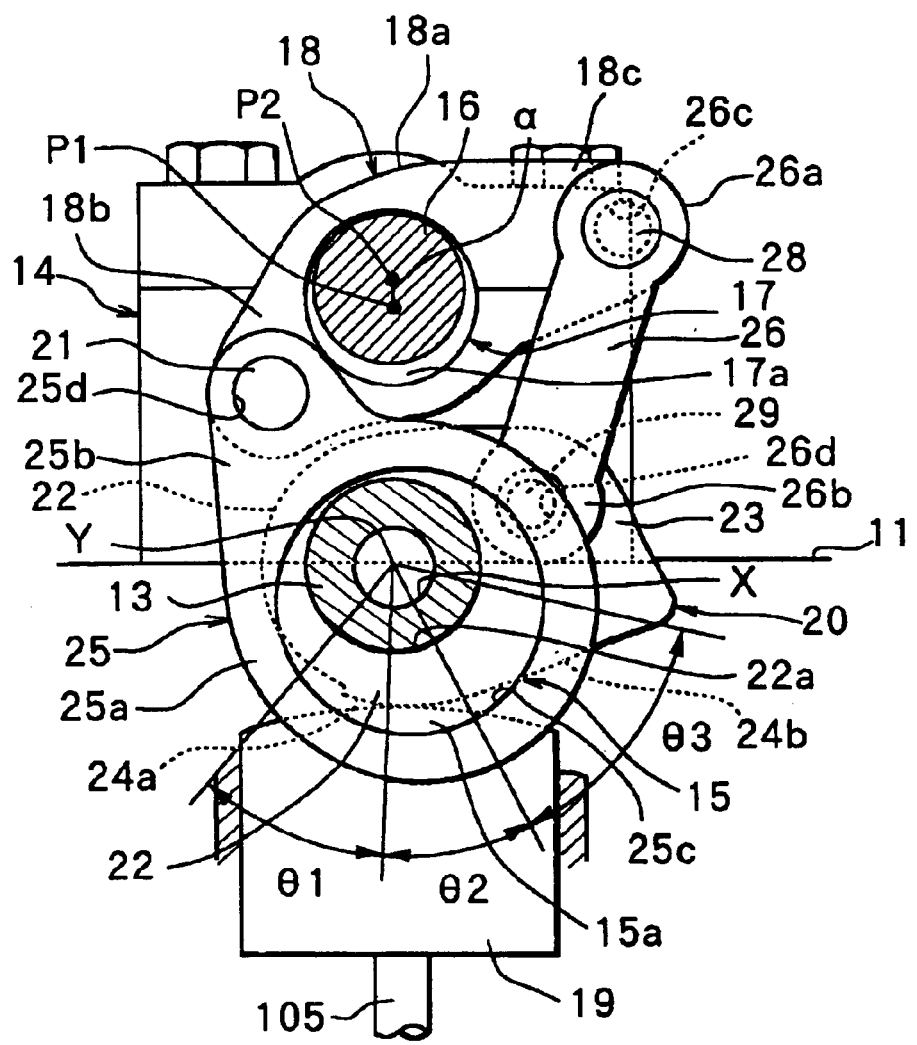
FIG. 2 is a cross section view showing a variable valve event and lift mechanism (A—A cross section of FIG. 3).
Figure 3:
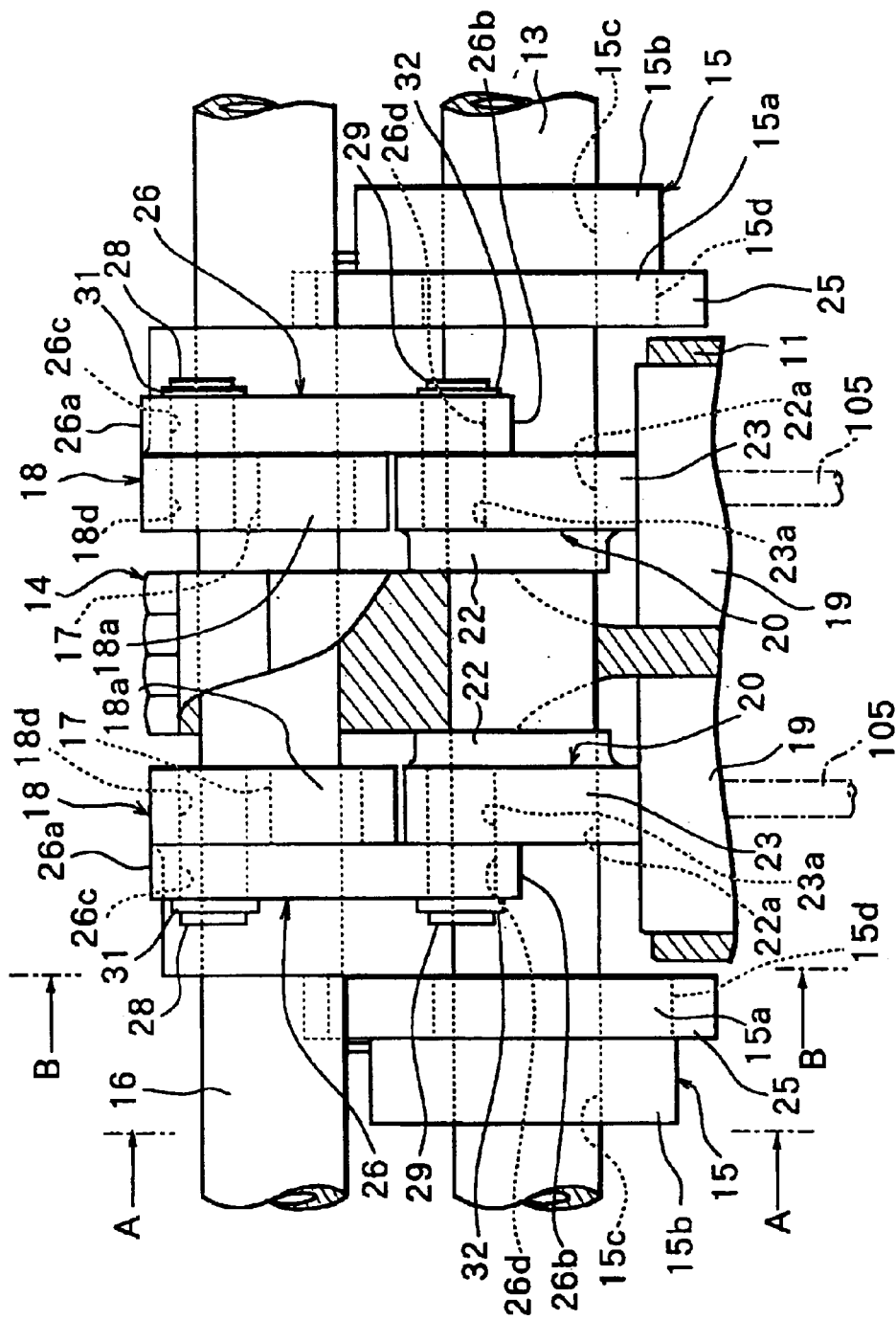
FIG. 3 is a side elevation view of the variable valve event and lift mechanism.
Figure 4:
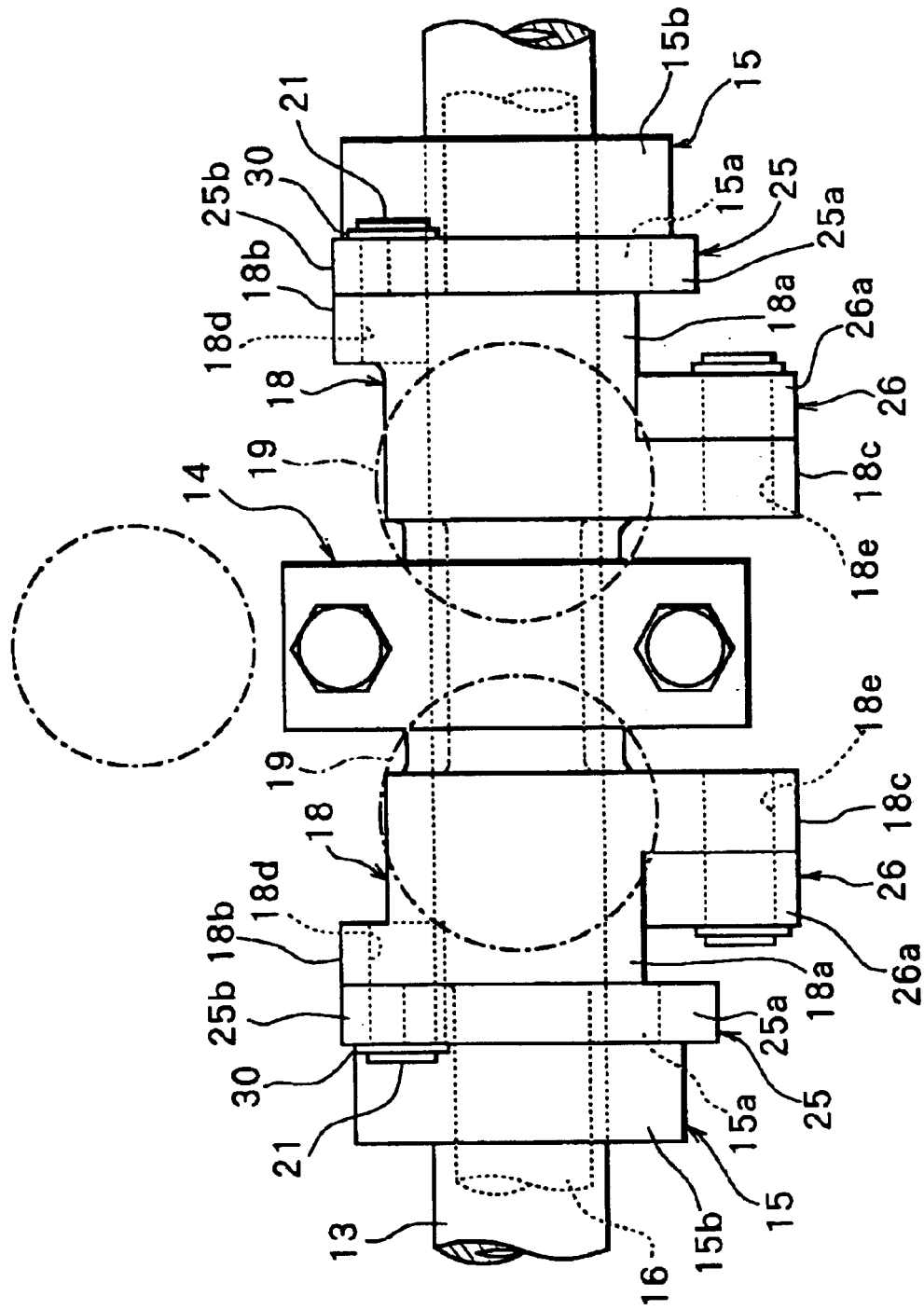
FIG. 4 is a top plan view of the variable valve event and lift mechanism.

FIG. 2 to FIG. 4 show in detail the structure of VEL mechanism 112.

However, the structure of variable valve mechanism that varies successively the valve lift amount of intake valve 105 is not limited to the above structure.

VEL mechanism 112, as shown in FIG. 2 to FIG. 4, includes a pair of intake valves 105, 105, a hollow camshaft 13 (drive shaft) rotatably supported by a cam bearing 14 of a cylinder head 11, two eccentric cams 15, 15 being rotation cams, axially supported by camshaft 13, a control shaft 16 rotatably supported by cam bearing 14 and arranged at an upper position of camshaft 13, a pair of rocker arms 18, 18 swingingly supported by control shaft 16 through a control cam 17, and a pair of swing cams 20, 20 disposed independently from each other to upper end portions of intake valves 105, 105 through valve lifters 19, 19, respectively.

Eccentric cams 15, 15 are connected with rocker arms 18, 18 by link arms 25, 25, respectively, and rocker arms 18, 18 are connected with swing cams 20, 20 by link members 26, 26.

Rocker arms 18, 18, link arms 25, 25, and link members 26, 26 constitute a transmission mechanism.

Figure 5:
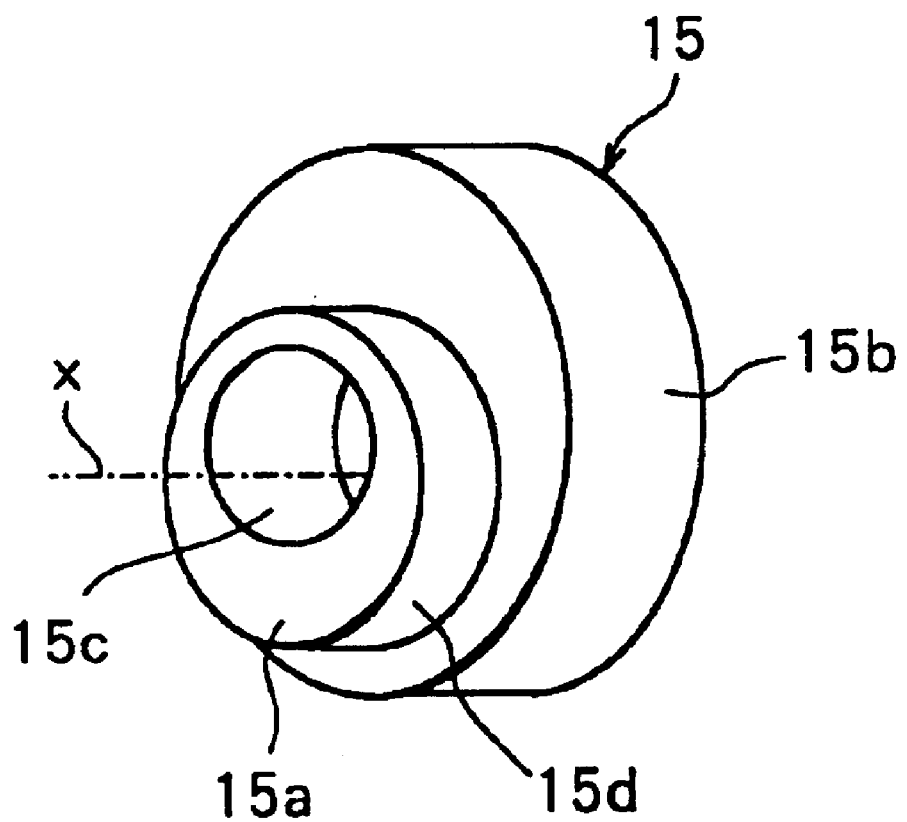
FIG. 5 is a perspective view showing an eccentric cam for use in the variable valve event and lift mechanism.

Each eccentric cam 15, as shown in FIG. 5, is formed in a substantially ring shape and includes a cam body 15a of small diameter, a flange portion 15b integrally formed on an outer surface of cam body 15a. A camshaft insertion hole 15c is formed through the interior of eccentric cam 15 in an axial direction, and also a center axis X of cam body 15a is biased from a center axis Y of camshaft 13 by a predetermined amount.

Eccentric cams 15, 15 are pressed and fixed to camshaft 13 via camshaft insertion holes 15c at outsides of valve lifters 19, 19, respectively, so as not to interfere with valve lifters 19, 19.

Each rocker arm 18, as shown in FIG. 4, is bent and formed in a substantially crank shape, and a central base portion 18a thereof is rotatably supported by control cam 17.

A pin hole 18d is formed through one end portion 18b which is formed to protrude from an outer end portion of base portion 18a. A pin 21 to be connected with a tip portion of link arm 25 is pressed into pin hole 18d. A pin hole 18e is formed through the other end portion 18c which is formed to protrude from an inner end portion of base portion 18a. A pin 28 to be connected with one end portion 26a (to be described later) of each link member 26 is pressed into pin hole 18e.

Control cam 17 is formed in a cylindrical shape and fixed to a periphery of control shaft 16. As shown in FIG. 2, a center axis P1 position of control cam 17 is biased from a center axis P2 position of control shaft 16 by a.

Figure 6:
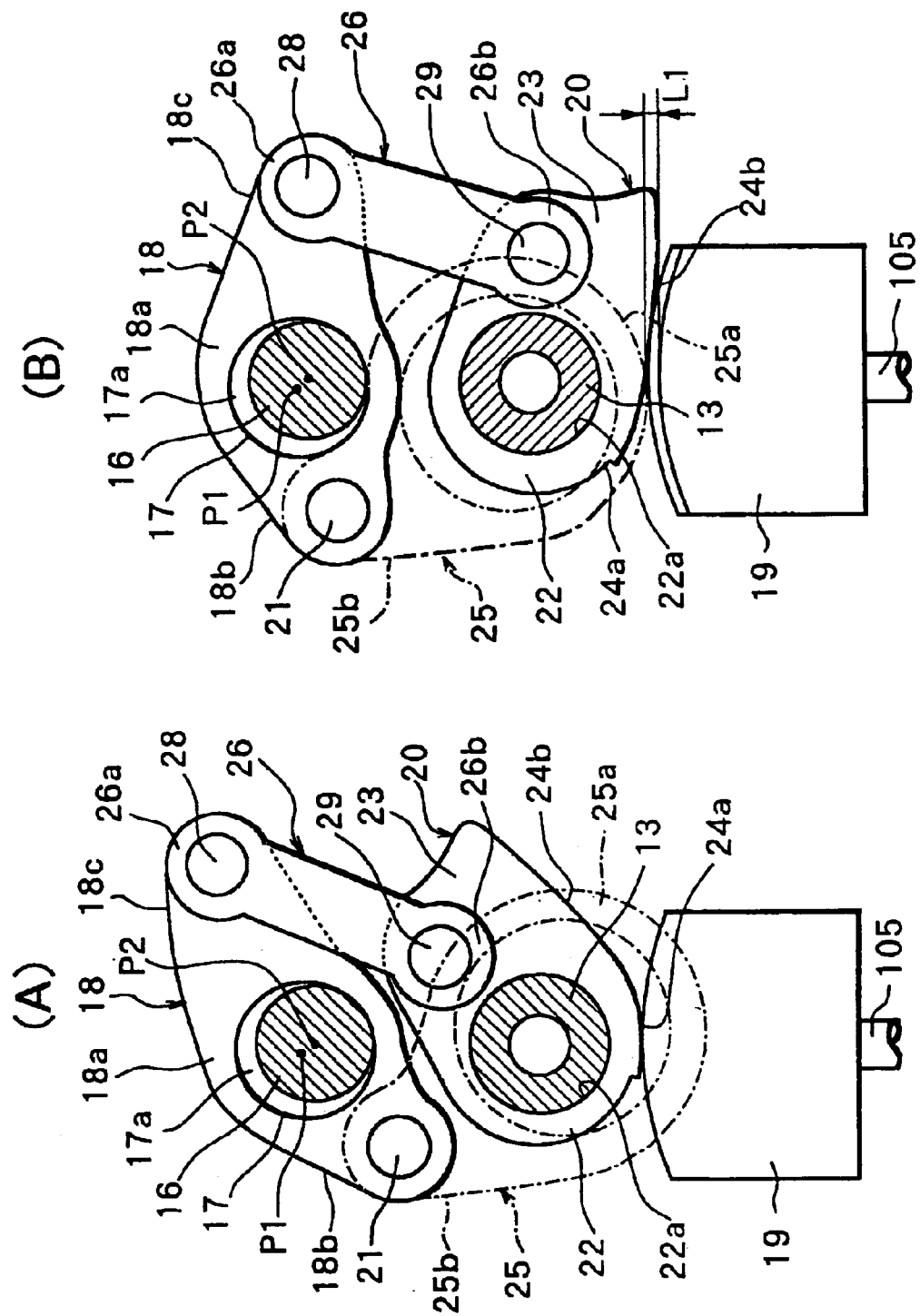
FIG. 6 is a cross section view showing an operation of the variable valve event and lift mechanism at a low lift condition (B—B cross section view of FIG. 3).
Figure 7:
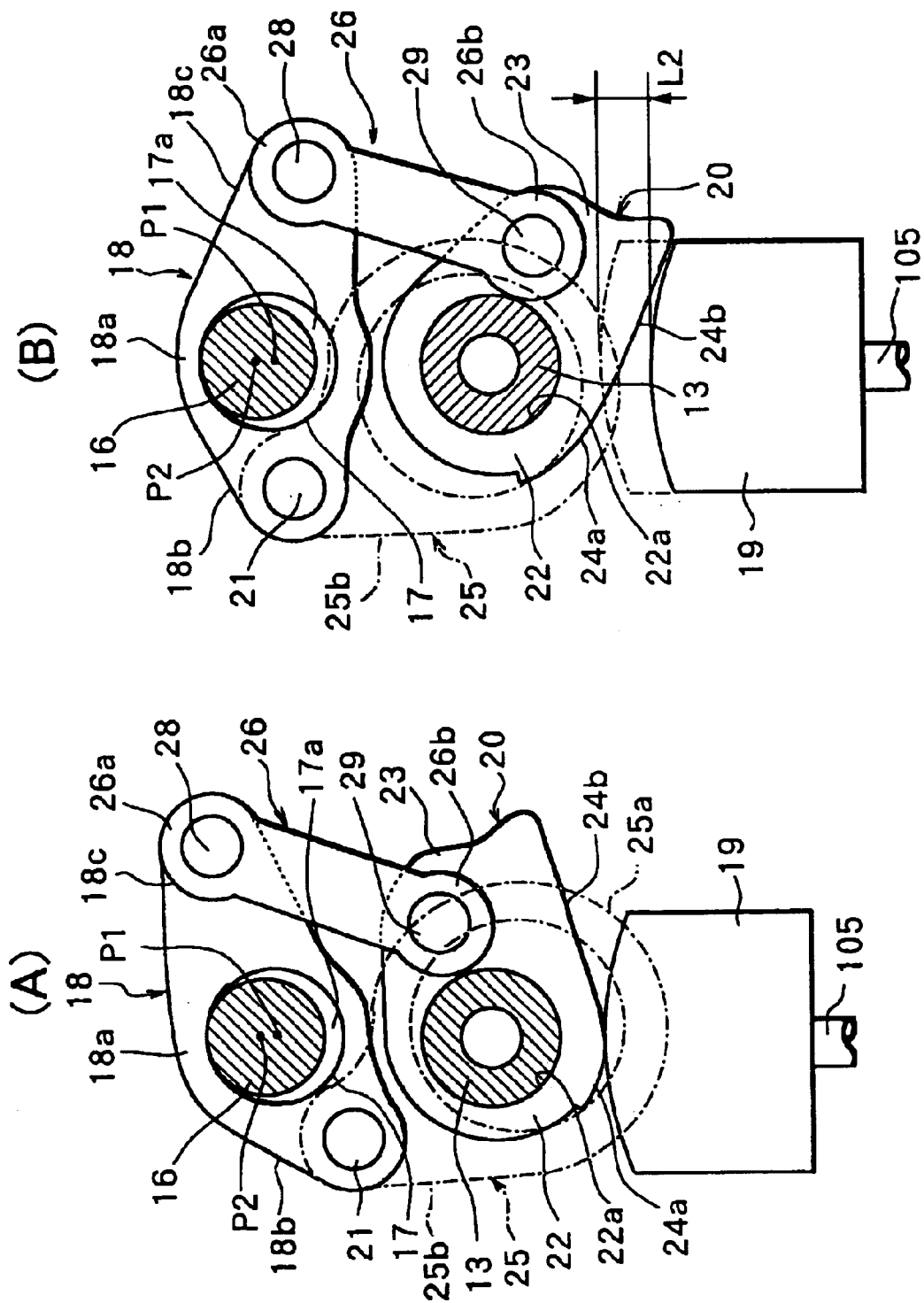
FIG. 7 is a cross section view showing an operation of the variable valve event and lift mechanism at a high lift condition (B—B cross section view of FIG. 3).

Swing cam 20 is formed in a substantially lateral U-shape as shown in FIG. 2, FIG. 6 and FIG. 7, and a supporting hole 22a is formed through a substantially ring-shaped base end portion 22. Camshaft 13 is inserted into supporting hole 22a to be rotatably supported. Also, a pin hole 23a is formed through an end portion 23 positioned at the other end portion 18c of rocker arm 18.

A base circular surface 24a of base end portion 22 side and a cam surface 24b extending in an arc shape from base circular surface 24a to an edge of end portion 23, are formed on a bottom surface of swing cam 20. Base circular surface 24a and cam surface 24b are in contact with a predetermined position of an upper surface of each valve lifter 19 corresponding to a swing position of swing cam 20.

Figure 8:
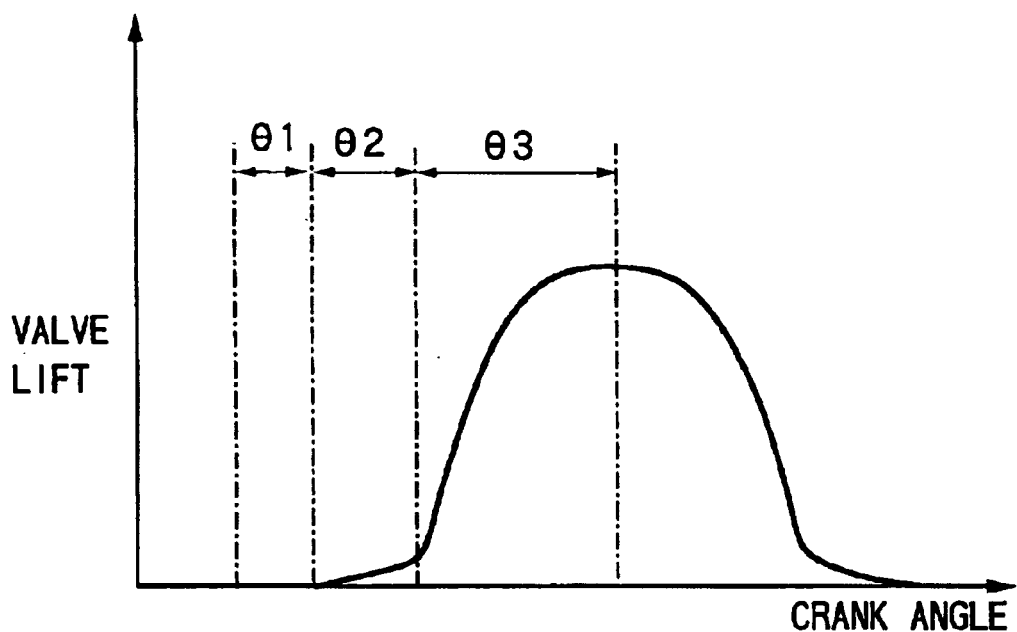
FIG. 8 is a valve lift characteristic diagram in the variable valve event and lift mechanism.

Namely, according to a valve lift characteristic shown in FIG. 8, as shown in FIG. 2, a predetermined angle range θ1 of base circular surface 24a is a base circle interval and a range of from base circle interval θ1 of cam surface 24b to a predetermined angle range θ2 is a so-called ramp interval, and a range of from ramp interval θ2 of cam surface 24b to a predetermined angle range θ3 is a lift interval.

Link arm 25 includes a ring-shaped base portion 25a and a protrusion end 25b protrudingly formed on a predetermined position of an outer surface of base portion 25a. A fitting hole 25c to be rotatably fitted with the outer surface of cam body 15a of eccentric cam 15 is formed on a central position of base portion 25a. Also, a pin hole 25d into which pin 21 is rotatably inserted is formed through protrusion end 25b.

Link member 26 is formed in a linear shape of predetermined length and pin insertion holes 26c, 26d are formed through both circular end portions 26a, 26b. End portions of pins 28, 29 pressed into pin hole 18d of the other end portion 18c of rocker arm 18 and pin hole 23a of end portion 23 of swing cam 20, respectively, are rotatably inserted into pin insertion holes 26c, 26d.

Snap rings 30, 31, 32 restricting axial transfer of link arm 25 and link member 26 are disposed on respective end portions of pins 21, 28, 29.

In the above structure, the valve lift amount is varied according to a positional relation between the center axis P2 of control shaft 16 and the center axis P1 of control cam 17, as shown in FIG. 6 and FIG. 7. Control shaft 16 is driven to rotate, so that the position of center axis P2 of control shaft 16 relative to the center axis P1 of control cam 17 is changed.

Figure 9:
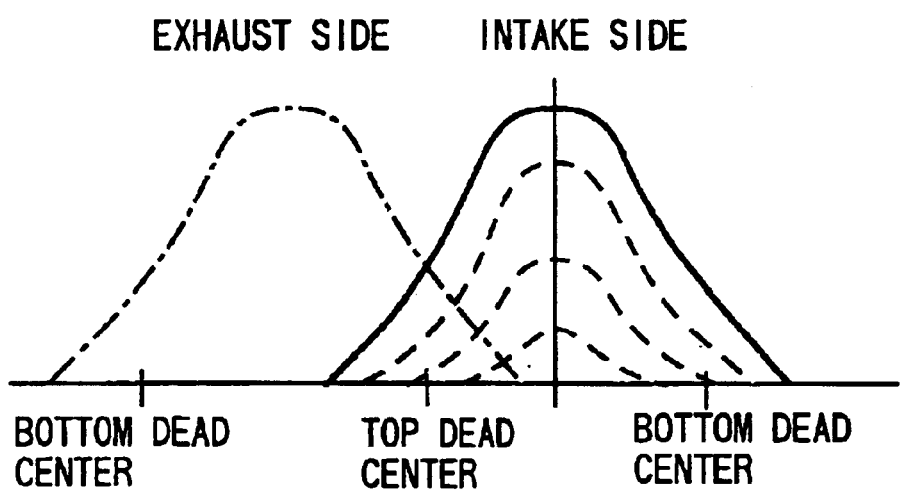
FIG. 9 is a characteristic diagram showing a correlation between a valve lift and an operating angle in the variable valve event and lift mechanism.
Figure 10:
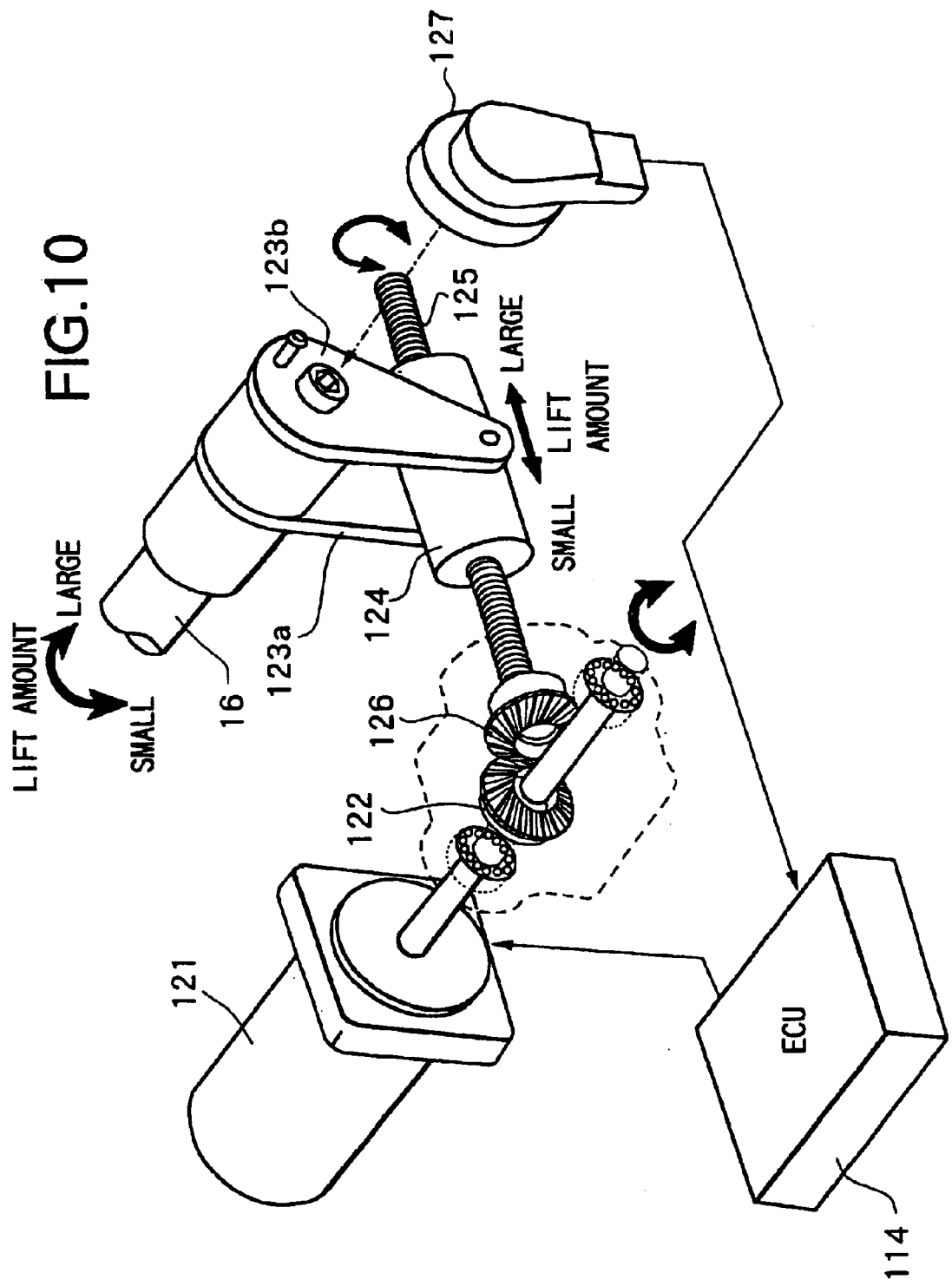
FIG. 10 is a perspective view showing a driving mechanism of a control shaft in the variable valve event and lift mechanism.

Control shaft 16 is driven to rotate within a predetermined rotation angle range by a DC servo motor (actuator) 121, as shown in FIG. 10. By varying an angle of control shaft 16 by actuator 121, the valve lift amount and valve operating angle of each of intake valves 105, 105 are successively varied (refer to FIG. 9).

In FIG. 10, DC servo motor 121 is arranged so that the rotation shaft thereof is parallel with control shaft 16, and a bevel gear 122 is axially supported by the tip portion of the rotation shaft.

On the other hand, a pair of stays 123a, 123b are fixed to the tip portion of control shaft 16. A nut 124 is swingingly supported around an axis parallel to control shaft 16 connecting the tip portions of the pair of stays 123a, 123b.

A bevel gear 126 meshed with bevel gear 122 is axially supported at the tip portion of a threaded rod 125 engaged with nut 124. Threaded rod 125 is rotated by the rotation of DC servo motor 121, and the position of nut 124 engaged with threaded rod 125 is displaced in the axial direction of threaded rod 125, so that control shaft 16 is rotated.

In this embodiment, the valve lift amount is decreased as the position of nut 124 approaches bevel gear 126, while the valve lift amount is increased as the position of nut 124 gets away from bevel gear 126.

Further, a potentiometer type angle sensor 127 detecting the angle of control shaft 16 is disposed on the tip end of control shaft 16. ECU 114 feedback controls DC servo motor 121 so that an actual angle detected by angle sensor 127 coincides with a target angle.

Next, the structure of VTC mechanism 113 will be described based on FIG. 11.

Figure 11:
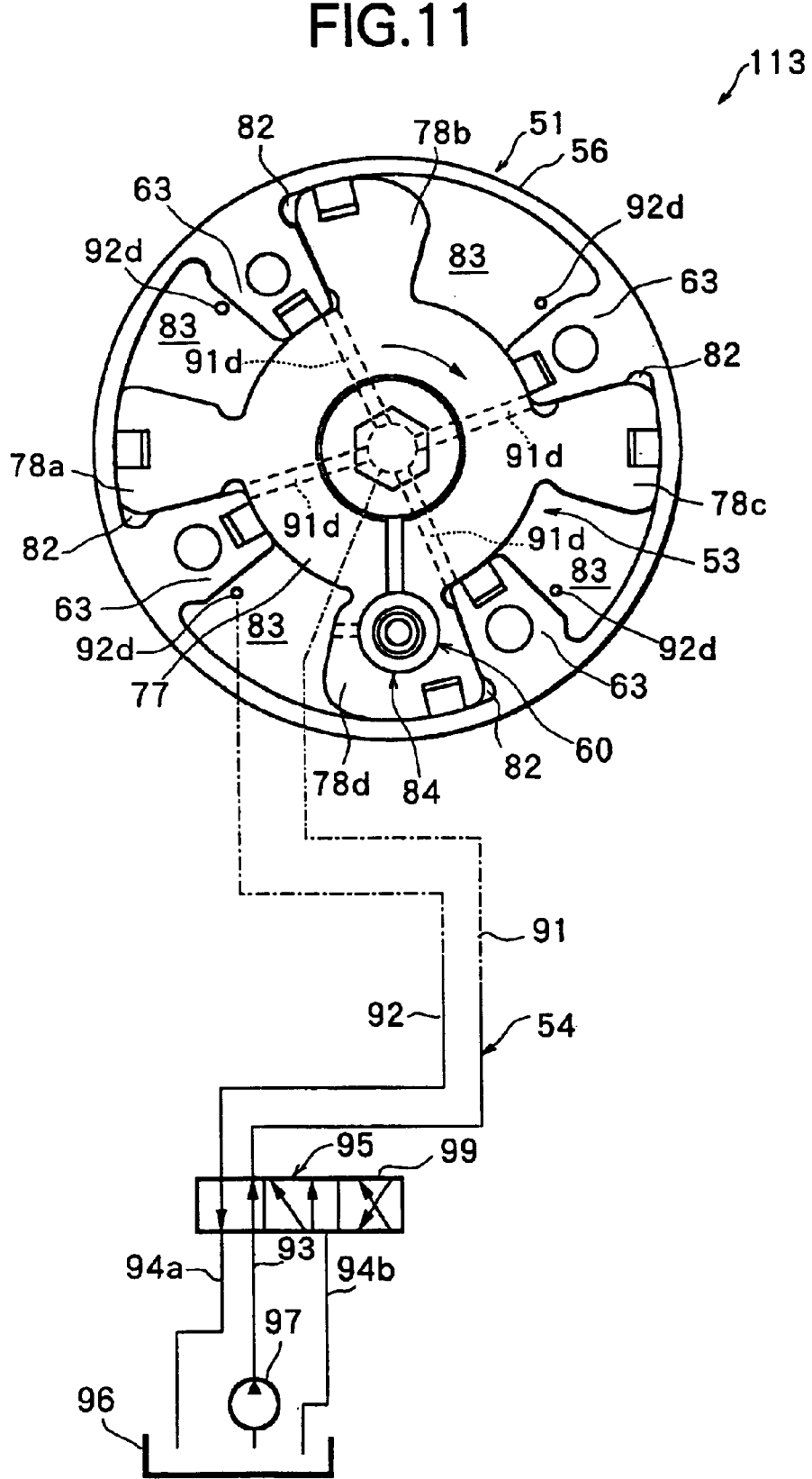
FIG. 11 is a longitudinal cross section view of a variable valve timing mechanism in the embodiment.

Note, VTC mechanism 113 is not limited to the one in FIG. 11, and may be of the constitution to successively vary a rotation phase of a camshaft relative to a crankshaft.

VTC mechanism 113 in this embodiment is a vane type variable valve timing mechanism, and comprises: a cam sprocket 51 (timing sprocket) which is rotatably driven by crankshaft 120 via a timing chain; a rotation member 53 secured to an end portion of intake side camshaft 13 and rotatably housed inside cam sprocket 51; a hydraulic circuit 54 that relatively rotates rotation member 53 with respect to cam sprocket 51; and a lock mechanism 60 that selectively locks a relative rotation position between cam sprocket 51 and rotation member 53 at predetermined positions.

Cam sprocket 51 comprises: a rotation portion (not shown in the figure) having on an outer periphery thereof, teeth for engaging with timing chain (or timing belt); a housing 56 located forward of the rotation portion, for rotatably housing rotation member 53; and a front cover and a rear cover (not shown in the figure) for closing the front and rear openings of housing 56.

Housing 56 presents a cylindrical shape formed with both front and rear ends open and with four partition portions 63 protrudingly provided at positions on the inner peripheral face at 90° in the circumferential direction, four partition portions 63 presenting a trapezoidal shape in transverse section and being respectively provided along the axial direction of housing 56.

Rotation member 53 is secured to the front end portion of intake side camshaft 13 and comprises an annular base portion 77 having four vanes 78a, 78b, 78c, and 78d provided on an outer peripheral face of base portion 77 at 90° in the circumferential direction.

First through fourth vanes 78a to 78d present respective cross-sections of approximate trapezoidal shapes. The vanes are disposed in recess portions between each partition portion 63 so as to form spaces in the recess portions to the front and rear in the rotation direction. Advance angle side hydraulic chambers 82 and retarded angle side hydraulic chambers 83 are thus formed.

Lock mechanism 60 has a construction such that a lock pin 84 is inserted into an engagement hole (not shown in the figure) at a rotation position (in the reference operating condition) on the maximum retarded angle side of rotation member 53.

Hydraulic circuit 54 has a dual system oil pressure passage, namely a first oil pressure passage 91 for supplying and discharging oil pressure to advance angle side hydraulic chambers 82, and a second oil pressure passage 92 for supplying and discharging oil pressure to retarded angle side hydraulic chambers 83. To these two oil pressure passages 91 and 92 are connected with a supply passage 93 and drain passages 94a and 94b, respectively, via an electromagnetic switching valve 95 for switching the passages.

An engine driven oil pump 97 for pumping oil in an oil pan 96 is provided in supply passage 93, and the downstream ends of drain passages 94a and 94b are communicated with oil pan 96.

First oil pressure passage 91 is formed substantially radially in base 77 of rotation member 53, and connected to four branching paths 91d communicating with each advance angle side hydraulic chamber 82. Second oil pressure passage 92 is connected to four oil galleries 92d opening to each retarded angle side hydraulic chamber 83.

With electromagnetic switching valve 95, an internal spool valve is arranged so as to control relatively the switching between respective oil pressure passages 91 and 92, and supply passage 93 and drain passages 94a and 94b.

ECU 114 controls the power supply quantity for an electromagnetic actuator 99 that drives electromagnetic switching valve 95, based on a duty control signal superimposed with a dither signal.

For example, when a control signal of duty ratio 0% (OFF signal) is output to electromagnetic actuator 99, the hydraulic fluid pumped from oil pump 97 is supplied to retarded angle side hydraulic chambers 83 via second oil pressure passage 92, and the hydraulic fluid in advance angle side hydraulic chambers 82 is discharged into oil pan 96 from first drain passage 94a via first oil pressure passage 91.

Consequently, an inner pressure of retarded angle side hydraulic chambers 83 becomes high while an inner pressure of advance angle side hydraulic chambers 82 becomes low, and rotation member 53 is rotated to the most retarded angle side by means of vanes 78a to 78d. The result of this is that a valve opening period (opening timing and closing timing) is delayed.

On the other hand, when a control signal of duty ratio 100% (ON signal) is output to electromagnetic actuator 99, the hydraulic fluid is supplied to inside of advance angle side hydraulic chambers 82 via first oil pressure passage 91, and the hydraulic fluid in retarded angle side hydraulic chambers 83 is discharged to oil pan 96 via second oil pressure passage 92, and second drain passage 94b, so that the inner pressure of retarded angle side hydraulic chambers 83 become low.

Therefore, rotation member 53 is rotated to the full to the advance angle side by means of vanes 78a to 78d. Due to this, the opening period (opening timing and closing timing) of intake valve 105 is advanced.

Note, the variable valve timing mechanism is not limited to the above vane type mechanism, and may be of the constitution as disclosed in Japanese Unexamined Patent Publication Nos. 2001-041013 and 2001-164951 in which a rotation phase of a camshaft relative to a crankshaft is changed by friction braking of an electromagnetic clutch (electromagnetic brake), or of the constitution as disclosed in Japanese Unexamined Patent Publication No. 9-195840 in which a helical gear is operated by a hydraulic pressure.

As described in the above, ECU 114 controls VEL mechanism 112 so that the target intake air amount according to the accelerator opening and the like can be obtained.

However, in a low lift region of intake valve 105, a change in intake air amount relative to a change in lift amount is larger than that in a high lift region.

Therefore, due to the small variation in lift amount between cylinders, the large variation in intake air amount occurs between cylinders in the low lift region, thereby resulting in the occurrence of the power variation or the degradation of emission performance.

Figure 12:
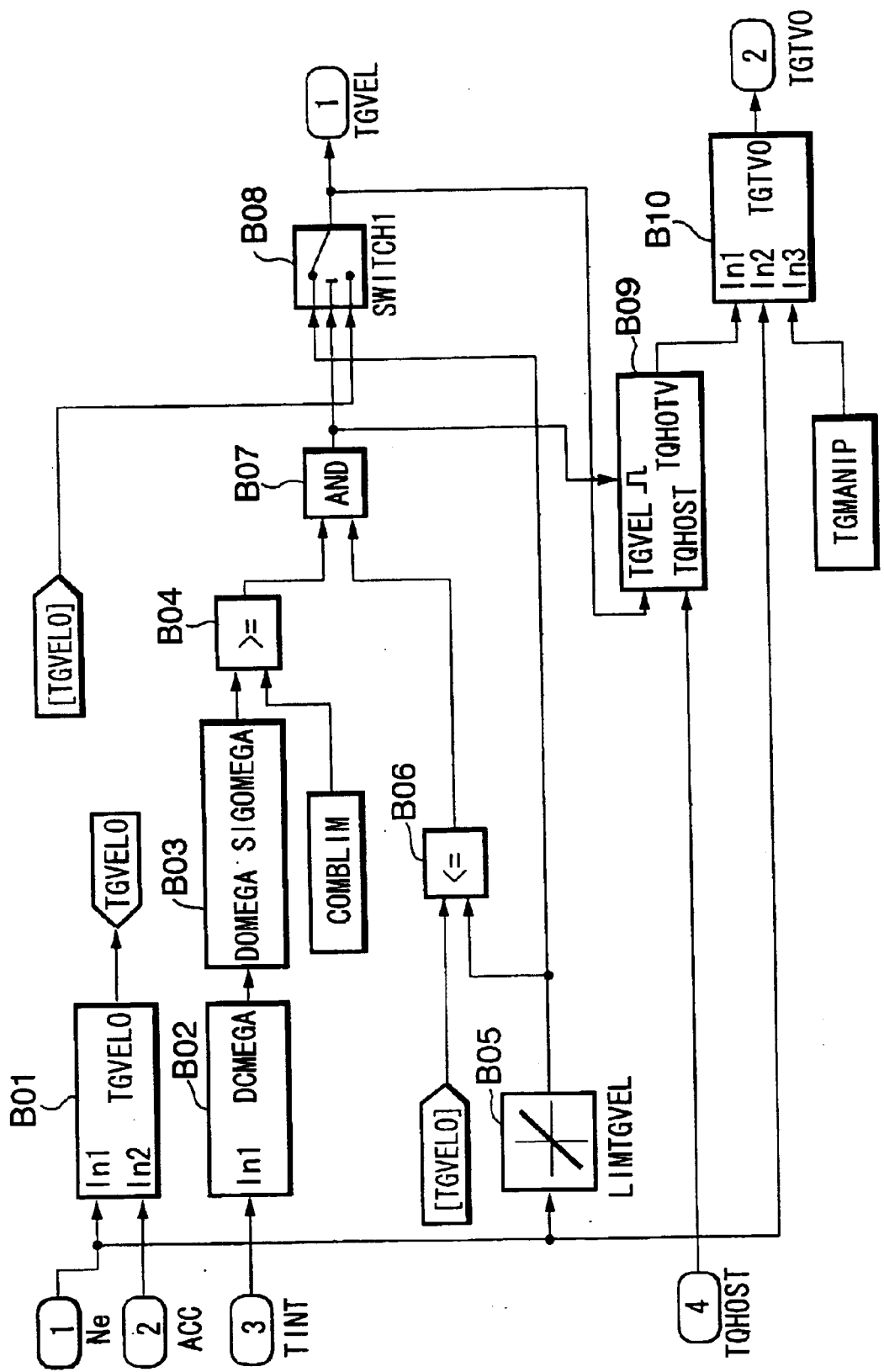
FIG. 12 is a block diagram showing the calculation of a target lift amount and a target throttle opening in the embodiment.

Accordingly, ECU 114 performs the calculation shown in FIG. 12, to prevent the power variation or the degradation of emission performance due to the variation in intake air amount between cylinders.

In FIG. 12, in a calculating section B01, a target lift amount TGVEL0 (target angle of control shaft 16) for obtaining the target intake air amount is calculated based on an engine rotation speed Ne and an accelerator opening ACC.

On the other hand, in a calculating section B02, a change amount DOMEGA of angular acceleration is calculated based on a cycle TINT of the detection signal from crank angle sensor 117.

In a calculating section B03, an integral value SIGOMEGA of the change amount DOMEGA of the angular acceleration is calculated.

The integral value SIGOMEGA is a parameter indicating the combustion variation in the present embodiment.

Note, other than the integral value SIGOMEGA, the rotation variation or the combustion pressure variation can be calculated as a parameter indicating the combustion variation.

In a comparison section B04, it is judged whether or not the integral value SIGOMEGA is an allowable value COMBLIM or above.

In the case where the integral value SIGOMEGA is the allowable value COMBLIM or above, it is judged that there occurs the combustion variation exceeding an allowable range.

Here, comparison section B04 outputs 1 when the integral value SIGOMEGA is the allowable value COMBLIM or above, while outputting 0 when the integral value SIGOMEGA is less than the allowable value COMBLIM.

Further, in a calculating section B05, a limiter LIMTGVEL of the lift amount of intake valve 105 is calculated based on the engine rotation speed Ne.

The limiter LIMTGVEL is a boundary value at which a characteristic in the change in intake air amount relative to the change in lift amount is changed over.

Namely, in the low lift region equal to or less than the limiter LIMTGVEL, the change in intake air amount is large relative to the change in lift amount, while in the high lift region exceeding the limiter LIMTGVEL, the change in intake air amount relative to the change in lift amount becomes small.

Then, in a comparison section B06, it is judged whether or not the target lift amount TGVEL0 is the limiter LIMTGVEL or less.

Comparison section B06 outputs 1 when the target lift amount TGVEL0 is the limiter LIMTGVEL or less, while outputting 0 when the target lift amount TGVEL0 exceeds the limiter LIMTGVEL.

A calculating section B07 receives the outputs from comparison sections B04 and B06, to perform the AND operation of these outputs.

That is, calculating section B07 outputs 1 only when the combustion variation exceeding the allowable range occurs and also the target lift amount TGVEL0 is the limiter LIMTGVEL or less.

The output from calculating section B07 is input to an output section B08.

Output section B08 outputs the limiter LIMTGVEL calculated in calculating section B05 as a target lift amount TGVEL if the output from calculating section B07 is 1, while outputting the target lift amount TGVEL0 calculated in calculating section B01 as the target lift amount TGVEL if the output from calculating section B07 is 0.

That is, if the combustion variation exceeding the allowable range occurs in the low lift region, it is judged that there occurs the variation in intake air amount due to the variation in lift amount between cylinders, to limit the target lift amount TGVEL to the limiter LIMTGVEL.

If the target lift amount TGVEL is the limiter LIMTGVEL, it is possible to suppress the variation in intake air amount relative to the variation in lift amount.

Accordingly, the power variation or an air-fuel ratio deviation between cylinders is suppressed, to thereby enable the improvement of drivability or emission performance.

If the target lift amount TGVEL0 calculated according to the target intake air amount is limited to the limiter LIMTGVEL, since the lift amount of intake valve 105 is controlled to become larger than a value consistent with the target intake air amount, it is impossible to practically control the intake air amount to the target intake air amount.

Therefore, when the target lift amount TGVEL0 is limited to the limiter LIMTGVEL, the opening of the throttle valve is reduced, so as to obtain the target intake air amount.

A control of the throttle valve will be described in the following.

A calculating section B09 executes the calculation process when the output from calculating section B07 is 1, in other words, the target lift amount TGVEL0 is limited to the limiter LIMTGVEL.

Figure 13:
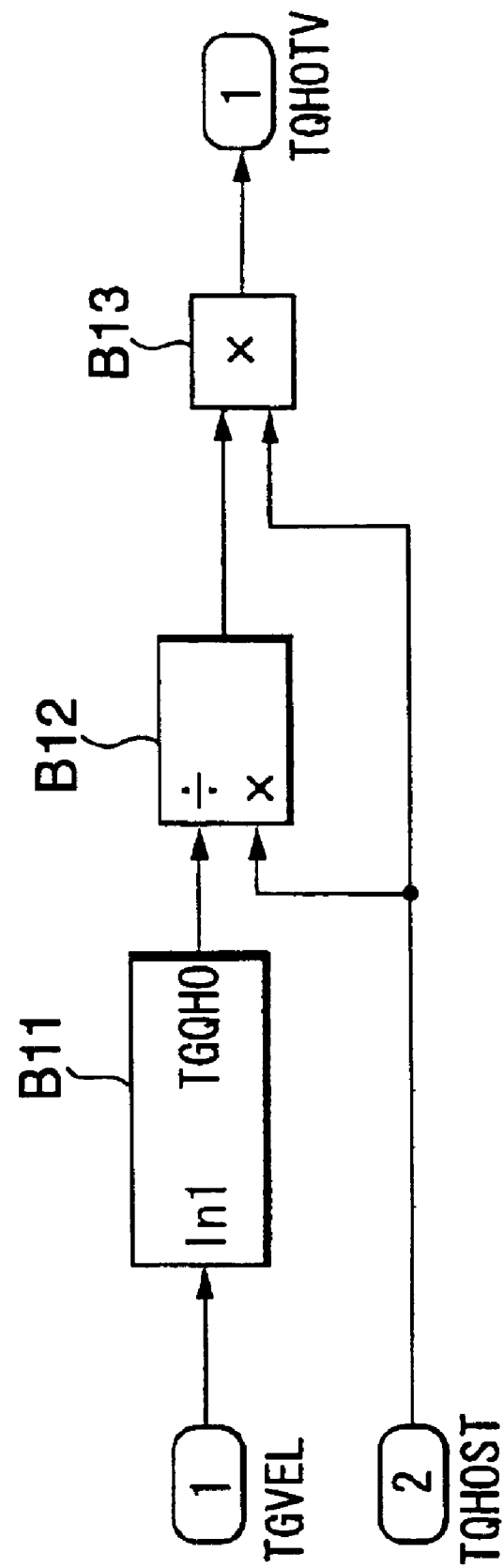
FIG. 13 is a block diagram showing the detail of a block correctively calculating a volume flow shown in FIG. 12.

Calculating section B09 executes the calculation process as shown in a block diagram of FIG. 13.

In FIG. 13, in a calculating section B11, the target lift amount TGVEL is converted into a volume flow TGQH0.

Then, in a calculating section B12, a ratio (TQH0ST/TGQH0) between a target volume flow TQH0ST equivalent to the target intake air amount and the volume flow TGQH0 corresponding to the target lift amount TGVEL is calculated.

In a calculating section B13, a result obtained by multiplying the ratio (TQH0ST/TGQH0) on the target volume flow TQH0ST is set to a target volume flow TQH0TV used for the calculation of a target throttle opening TGTVO.

The target volume flow TQH0TV is input to a calculating section B10.

In calculating section B10, the target throttle opening TGTVO is calculated based on the target volume flow TQH0TV, the engine rotation speed Ne, and the target intake pressure/atmospheric pressure TGMANIP.

Thus, when the target lift amount TGVEL0 is limited to the limiter LIMTGVEL, the target throttle opening TGTVO is calculated to be smaller, so as to obtain the target intake air amount.

Note, a failure diagnosis can be performed based on the parameter indicating the combustion variation.

That is, in the case where a failure judgment value larger than the allowable value compared with the parameter indicating the combustion variation in comparison section B04, is set, and the parameter indicating the combustion variation exceeds the failure judgment value, it is judged that VEL mechanism 112 is failed.

Then, when it is judged that VEL mechanism 112 is failed, the target lift amount TGVEL is fixed to a maximum amount, to control the intake air amount by means of the throttle valve and also to turn a warning light on.

Further, in the case where the engine consists of a plurality of cylinder groups and VEL mechanism 112 is disposed for each cylinder group, since the characteristic of the variation in intake air amount is different for each cylinder group, the combustion variation can be calculated for each cylinder group.

For example, in the case of a V-type engine consisting of two banks, it is possible to detect the combustion variation for each bank.

However, if the target lift amount is limited for each bank based on the combustion variation detected for each bank, a deviation in intake air amount occurs between the banks.

Therefore, when the target lift amount is the limiter LIMTGVEL or less in one bank, and when the combustion variation exceeding the allowable value is detected, if the target lift amounts of both banks are limited to the limiter LIMTGVEL, it is possible to avoid a torque deviation or the occurrence of air-fuel ratio deviation between banks.

Further, it is possible to limit the target lift amount independently in each bank, to thereby correct the air-fuel ratio deviation between banks.

In order to correct the air-fuel ratio deviation between banks, firstly, the intake air amount in each bank is estimated based on the target lift amount of each bank and the engine rotation speed.

Then, a fuel injection quantity is calculated for each bank based on the intake air amount in each bank.

Further, an exhaust air-fuel ratio is detected for each bank, to perform an air-fuel ratio feedback control independently in each bank.

Even if there occurs the air-fuel ratio deviation between banks as the result of the calculation of fuel injection quantity for each bank and/or the air-fuel ratio feedback control in each bank, it is possible to control an air-fuel ratio to a target air-fuel ratio.

Further, in order to resolve the torque deviation due to the air-fuel ratio deviation between banks, it is possible to correct ignition timing for each bank.

In the above embodiment, the constitution is such that the target lift amount is limited based on the combustion variation. However, the constitution may be such that the target lift amount is limited based on the variation in lift amount.

An embodiment in which the target lift amount is limited based on the variation in lift amount will be described in accordance with a flowchart of FIG. 14.

Figure 14:
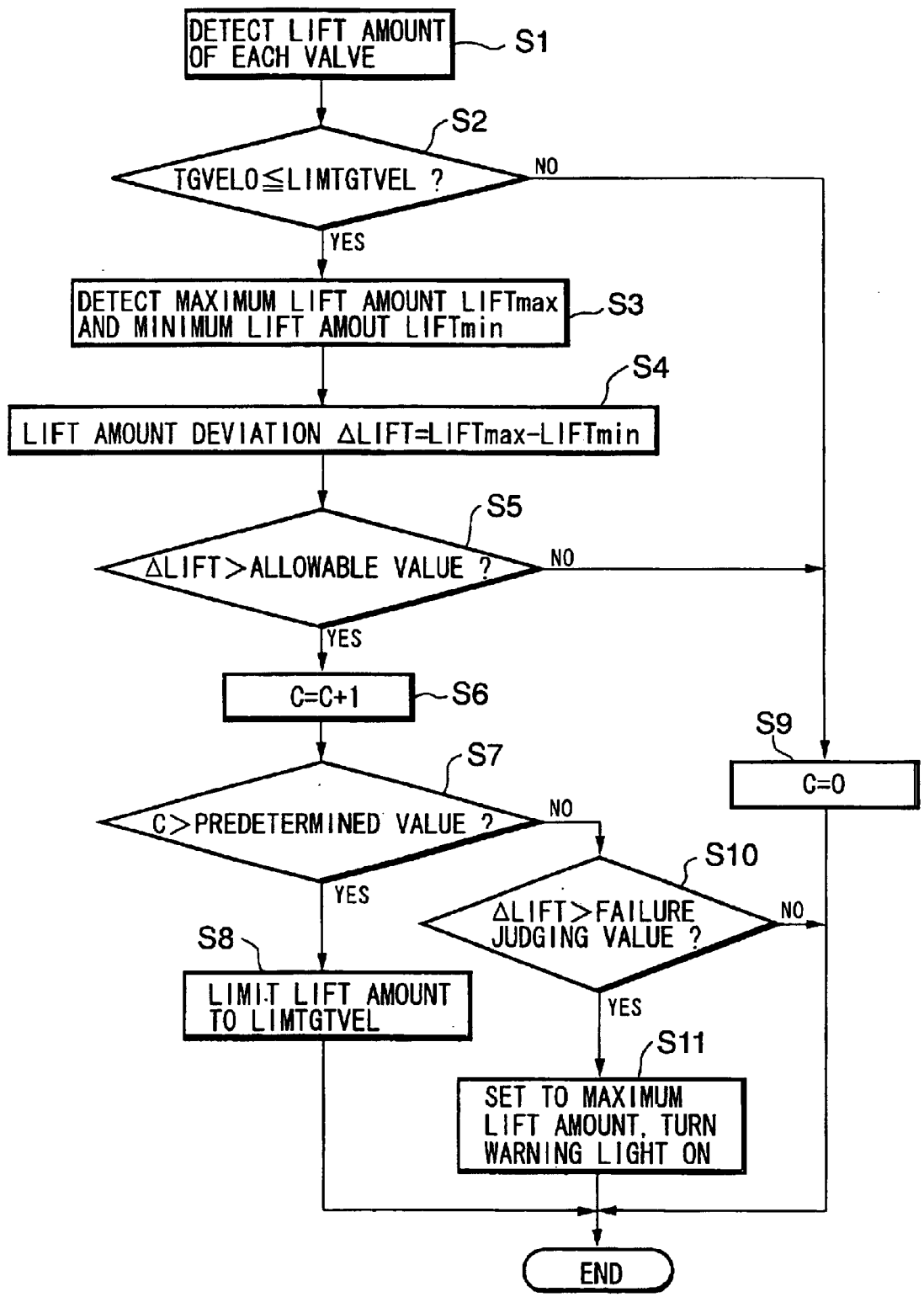
FIG. 14 is a flowchart showing a limiting control of the target lift amount due to the variation in lift amount in the embodiment.

In the flowchart of FIG. 14, firstly, in step S1, the lift amounts of each intake valve 105 are detected by a lift sensor 132 disposed on each intake valve 105.

In step S2, it is judged whether or not the target lift amount TGVEL at the time is equal to or less than the limiter LIMTGVEL.

If the target lift amount TGVEL is the limiter LIMTGVEL or less, control proceeds to step S3.

In step S3, a maximum lift amount LIFTmax and a minimum lift amount LIFTmin are detected, respectively, among the valve lift amounts of each intake valve 105 detected in step S1.

Then, in next step S4, a deviation ΔLIFT between the maximum lift amount LIFTmax and the minimum lift amount LIFTmin is calculated.

$$\Delta LIFT = LIFTmax - LIFTmin$$

In step S5, it is judged whether or not the deviation ΔLIFT exceeds an allowable value.

If the deviation ΔLIFT exceeds the allowable value, control proceeds to step S6, to count up a counter C by 1.

Then, in step S7, it is judged whether or not a value of counter C exceeds a predetermined value.

If the value of counter C exceeds the predetermined value, control proceeds to step S8, in which the target lift amount TGVEL is limited to the limiter LIMTGVEL.

Thus, it is avoided that the intake air amount is controlled in the low lift region where a large difference occurs in the intake air amount due to a small difference in lift amount.

Accordingly, even if there occurs the variation in lift amount between cylinders, the variation in intake air amount between cylinders is suppressed, thereby preventing the occurrence of torque variation or the deterioration of emission performance or fuel consumption.

When it is judged in step S2 that the target lift amount TGVEL exceeds the limiter LIMTGVEL, control proceeds to step S9, to reset counter C to zero.

Further, also when it is judged in step S5 that the deviation ΔLIFT is the allowable value or less, control proceeds to step S9, to reset counter C to zero.

When it is judged in step S7 that the value of counter C does not exceeds the predetermined value, control proceeds to step S10.

In step S10, it is judged whether or not the deviation ΔLIFT exceeds the failure judgment value.

If the deviation ΔLIFT exceeds the failure judgment value, control proceeds to step S11, in which the target lift amount TGVEL is fixed to the maximum lift amount, and the intake air amount is controlled by means of the throttle valve and also the warning light is turned on.

The entire contents of Japanese Patent Application No. 2002-358310 filed Dec. 10, 2002, a priority of which is claimed, are incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention are provided for illustration only, and not for the purpose of limiting the invention as defined by the appended claims and their equivalents.

What is claimed is:

1. A variable valve control apparatus for an internal combustion engine provided with a plurality of cylinders, comprising:
   an intake valve disposed to each of said plurality of cylinders;
   a variable valve mechanism that varies successively a lift amount of said intake valve;
   a controller that controls said variable valve mechanism based on a target lift amount corresponding to a target intake air amount of said internal combustion engine; and
   a detector detecting the combustion variation of said internal combustion engine,
   wherein, when the target lift amount of said intake valve is a predetermined value or less, said controller limits the target lift amount of said intake valve to a value that is greater than or equal to said predetermined value when the combustion variation of said internal combustion engine reaches a value that is greater than or equal to an allowable value.

2. A variable valve apparatus for an internal combustion engine according to claim 1,
   wherein a throttle valve that is opened and closed by an actuator is disposed to an intake pipe of said internal combustion engine, and
   wherein said controller controls an opening of said throttle valve to control an intake air amount to the target intake air amount, when limiting the target lift amount of said intake valve to the value that is greater than or equal to said predetermined value.

3. A variable valve apparatus for an internal combustion engine according to claim 1,
   wherein said internal combustion engine includes a plurality of cylinder groups, and also said variable valve mechanism is disposed to each of said plurality of cylinder groups, wherein said detector detects the combustion variation of each of said plurality of cylinder groups, and wherein said controller limits the target lift amount for each of said plurality of cylinder groups.

4. A variable valve apparatus for an internal combustion engine according to claim 3, wherein said controller controls a fuel injection quantity for each of said plurality of cylinder groups depending on a difference in target lift amount between said plurality of cylinder groups.

5. A variable valve apparatus for an internal combustion engine according to claim 3, wherein said controller controls ignition timing for each of said plurality of cylinder groups depending on a difference in target lift amount between said plurality of cylinder groups.

6. A variable valve apparatus for an internal combustion engine according to claim 1, wherein said controller outputs a failure detection signal of said variable valve mechanism when the combustion variation of said internal combustion engine exceeds a failure judgment value larger than said allowable value.

7. A variable valve apparatus for an internal combustion engine according to claim 1, wherein there is provided a rotation detector detecting a rotation speed of said internal combustion engine, and wherein said controller variably sets the predetermined value of said target lift amount according to the engine rotation speed.

8. A variable valve control apparatus for an internal combustion engine provided with a plurality of cylinders, comprising:

an intake valve disposed to each of said plurality of cylinders;

variable valve means for varying successively a lift amount of said intake valve;

calculating means for calculating a target lift amount corresponding to a target intake air amount of said internal combustion engine;

detecting means for detecting the combustion variation of said internal combustion engine;

limiting means for limiting, when the target lift amount of said intake valve is a predetermined value or less, the target lift amount calculated by said calculating means to a value that is greater than or equal to said predetermined value when the combustion variation of said internal combustion engine reaches a value that is greater than or equal to an allowable value; and control means for controlling said variable valve means based on said target lift amount.

9. A variable valve control apparatus for an internal combustion engine provided with a plurality of cylinders, comprising:

an intake valve disposed to each of said plurality of cylinders;

a variable valve mechanism that varies successively a lift amount of said intake valve;

a controller that controls said variable valve mechanism based on a target lift amount corresponding to a target intake air amount of said internal combustion engine; and a detector detecting the lift amount for each intake valve, wherein, when the target lift amount of said intake valve is a predetermined value or less, said controller limits the target lift amount of said intake valve to a value that is greater than or equal to said predetermined value when the variation in lift amount of said intake valve is a value that is greater than or equal to an allowable value.

10. A variable valve apparatus for an internal combustion engine according to claim 9, wherein a throttle valve that is opened and closed by an actuator is disposed to an intake pipe of said internal combustion engine, and wherein said controller controls an opening of said throttle valve to control an intake air amount to the target intake air amount, when limiting the target lift amount of said intake valve to the value that is greater than or equal to said predetermined value.

11. A variable valve apparatus for an internal combustion engine according to claim 9, wherein said controller outputs a failure detection signal of said variable valve mechanism when the variation in lift amount exceeds a failure judgment value larger than said allowable value.

12. A variable valve apparatus for an internal combustion engine according to claim 9, wherein there is provided a rotation detector detecting a rotation speed of said internal combustion engine, and wherein said controller variably sets the predetermined value of said target lift amount according to the engine rotation speed.

13. A variable valve control apparatus for an internal combustion engine provided with a plurality of cylinders, comprising:

an intake valve disposed to each of said plurality of cylinders;

variable valve means for varying successively a lift amount of said intake valve;

calculating means for calculating a target lift amount corresponding to a target intake air amount of said internal combustion engine;

detecting means for detecting the lift amount for each intake valve;

limiting means for limiting, when the target lift amount is a predetermined value or less, the target lift amount to a value that is greater than or equal to said predetermined value when the variation in lift amount of said intake valve is a value that is greater than or equal to an allowable value; and control means for controlling said variable valve means based on said target lift amount.

14. A variable valve control method for an internal combustion engine provided with an intake valve for each of a plurality of cylinders, and a variable valve mechanism that varies successively a lift amount of said intake valve, comprising the steps of:

calculating a target lift amount corresponding to a target intake air amount of said internal combustion engine;

detecting the combustion variation of said internal combustion engine;

limiting, when the target lift amount is a predetermined value or less, the target lift amount to a value that is greater than or equal to said predetermined value when the combustion variation of said internal combustion engine reaches a value that is greater than or equal to an allowable value; and controlling said variable valve mechanism based on said target lift amount.

15. A variable valve method for an internal combustion engine according to claim 14, further comprising the step of:

controlling an opening of a throttle valve disposed to an intake pipe of said internal combustion engine, to control an intake air amount to the target intake air amount when limiting the target lift amount to the value that is greater than or equal to said predetermined value.

16. A variable valve method for an internal combustion engine according to claim 14,
   wherein said step of detecting the combustion variation detects the combustion variation of each of a plurality of cylinder groups, each group provided independently with said variable valve mechanism, and
   wherein said step of limiting said target lift amount limits the target lift amount for each of said plurality of cylinder groups.

17. A variable valve method for an internal combustion engine according to claim 16, further comprising the step of:
   controlling a fuel injection quantity for each of said plurality of cylinder groups depending on a difference in target lift amount between said plurality of cylinder groups.

18. A variable valve method for an internal combustion engine according to claim 16, further comprising the step of:
   controlling ignition timing for each of said plurality of cylinder groups depending on a difference in target lift amount between said plurality of cylinder groups.

19. A variable valve method for an internal combustion engine according to claim 14, further comprising the step of:
   outputting a failure detection signal of said variable valve mechanism when the combustion variation of said internal combustion engine exceeds a failure judgment value larger than said allowable value.

20. A variable valve method for an internal combustion engine according to claim 14, further comprising the steps of:
   detecting a rotation speed of said internal combustion engine; and
   setting the predetermined value of said target lift amount according to the engine rotation speed.

21. A variable valve control method for an internal combustion engine provided with an intake valve for each of a plurality of cylinders, and a variable valve mechanism that varies successively a lift amount of said intake valve, comprising the steps of:
   calculating a target lift amount corresponding to a target intake air amount of said internal combustion engine;
   detecting a lift amount for each intake valve;
   limiting, when the target lift amount of said intake valve is a predetermined value or less, the target lift amount of said intake valve to a value that is greater than or equal to said predetermined value when the variation in lift amount of said intake valve is a value that is greater than or equal to an allowable value; and
   controlling said variable valve mechanism based on said target lift amount.

22. A variable valve method for an internal combustion engine according to claim 21, further comprising the step of:
   controlling an opening of a throttle valve disposed to an intake pipe of said internal combustion engine, to control an intake air amount to the target intake air amount when limiting the target lift amount to the value that is greater than or equal to said predetermined value.

23. A variable valve method for an internal combustion engine according to claim 21, further comprising the step of:
   outputting a failure detection signal of said variable valve mechanism when the variation in lift amount exceeds a failure judgment value larger than said allowable value.

24. A variable valve method for an internal combustion engine according to claim 21, further comprising the steps of:
   detecting a rotation speed of said internal combustion engine; and
   variably setting the predetermined value of said target lift amount according to the engine rotation speed.

* * * * *